United States Patent
Desmond

(10) Patent No.: US 10,623,820 B1
(45) Date of Patent: Apr. 14, 2020

(54) METHOD AND SYSTEM FOR USER CONFIGURATION OF CHANNEL ORDER IN ELECTRONIC PROGRAM GUIDE

(71) Applicant: The DIRECTV Group, Inc., El Segundo, CA (US)

(72) Inventor: Randall M. Desmond, Lawndale, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 14/587,920

(22) Filed: Dec. 31, 2014

(51) Int. Cl.
*H04N 21/482* (2011.01)
*H04N 21/485* (2011.01)

(52) U.S. Cl.
CPC ....... *H04N 21/482* (2013.01); *H04N 21/4858* (2013.01); *H04N 21/4823* (2013.01); *H04N 21/4826* (2013.01)

(58) Field of Classification Search
CPC ............. H04N 21/482; H04N 21/4821; H04N 21/4823; H04N 21/4825; H04N 21/4826
See application file for complete search history.

(56) References Cited

U.S. PATENT DOCUMENTS

| | | | | |
|---|---|---|---|---|
| 8,046,793 B2 * | 10/2011 | Li | ..................... | H04N 5/44543 725/38 |
| 8,266,649 B2 * | 9/2012 | Drazin | ............... | H04N 5/44543 725/28 |
| 2002/0175953 A1 * | 11/2002 | Lin | ................... | H04N 21/42204 715/811 |
| 2003/0115589 A1 * | 6/2003 | D'Souza | ................ | H04H 60/43 725/10 |
| 2005/0251828 A1 * | 11/2005 | Young | .................. | G04G 15/006 725/52 |
| 2007/0061840 A1 * | 3/2007 | Walter | ...................... | H04N 5/50 725/39 |
| 2008/0229359 A1 * | 9/2008 | Robinson | ........... | H04N 5/44543 725/46 |
| 2012/0054679 A1 * | 3/2012 | Ma | ..................... | H04N 21/4532 715/810 |

OTHER PUBLICATIONS

Non-final Office action dated Sep. 15, 2015 in U.S. Appl. No. 14/587,893 filed Dec. 31, 2014 by Sameer Chowdhry et al.
Final Rejection dated Apr. 13, 2016 in U.S. Appl. No. 14/587,893, filed Dec. 31, 2014 by Sameer Chowdhry et al.

* cited by examiner

*Primary Examiner* — James R Marandi

(57) ABSTRACT

A channel order mapping is stored in memory of a user device and includes a list of channels that can be displayed on the display and an order that the channels are to be displayed in an electronic program guide (EPG) on the display. A display control module, in response to a first user input to display the EPG, displays on the display the EPG. This EPG includes: the channels in the order indicated in the channel order mapping. An order updating module, in response to user input to change the order, changes the order stored the channel order mapping according to changes commanded by a user of the user device. In response to a second user input to display the EPG received after the updating, the display control module displays on the display the EPG including: the channels in the updated order indicated in the channel order mapping.

16 Claims, 7 Drawing Sheets

| Order | Channel |
|---|---|
| 1 | 1 |
| 2 | 2 |
| 3 | 3 |
| . . . | . . . |

FIG. 7A

| Order | Channel |
|---|---|
| 1 | 33 |
| 2 | 46 |
| 3 | 28 |
| 4 | 17 |
| 5 | 1 |
| . . . | . . . |

FIG. 7B

METHOD AND SYSTEM FOR USER CONFIGURATION OF CHANNEL ORDER IN ELECTRONIC PROGRAM GUIDE

TECHNICAL FIELD

The present disclosure relates generally communicating between a service provider and a user device, and, more specifically, to enabling a service such as a video download service through a user device such as a set top box.

BACKGROUND

The statements in this section merely provide background information related to the present disclosure and may not constitute prior art.

Satellite television has become increasingly popular due to the wide variety of content and the quality of content available. A satellite television system typically includes a set top box that receives satellite signals and decodes the satellite signals for use on a television. The set top box typically includes a memory, such as for storing operating code of the set top box. Some set top boxes a digital video recorder or the like for storing received content. Because of the numerous components associated with the set top box, having one set top box for each individual television may be relatively expensive.

Satellite television systems typically broadcast content to a number of users simultaneously. Satellite television systems also offer subscription or pay-per-view access to broadcast content. Access to subscription or pay-per-view content may be provided using signals broadcast over the satellite. Once access is provided, a user can access particular content.

Electronic devices are increasingly accessing the Internet. For example, some flat panel televisions may connect to the Internet, wirelessly and/or by wire, to enhance the customer experience and provide additional viewing options. Electronic devices may access various content sources via the Internet, such as movie and other video sources, weather data sources, stock data sources, etc.

SUMMARY

In a feature, a method for displaying video content on a display is disclosed. The method includes: storing, using a user device, a channel order mapping in memory of the user device, the channel order mapping including a list of channels that can be displayed on the display and an order that the channels are to be displayed in an electronic program guide (EPG) on the display. The method further includes, in response to a first user input to display the EPG, using the user device, displaying on the display the EPG including: the channels in the order indicated in the channel order mapping; and information regarding content scheduled to be broadcast on the channels, respectively. The method further includes, in response to user input to change the order, using the user device, changing the order stored the channel order mapping according to changes commanded by a user of the user device. The method further includes, in response to a second user input to display the EPG received after the updating, using the user device, displaying on the display the EPG including: the channels in the updated order indicated in the channel order mapping after the updating; and information regarding content scheduled to be broadcast on the channels, respectively.

In further features, the method further includes, using the user device, moving a selected channel up in the order stored in the channel order mapping in response to a command from the user to move the selected channel up in the order.

In further features, the method further includes, using the user device, moving a selected channel up and down in the order stored in the channel order mapping in response to commands from the user to move the selected channel up and down, respectively, in the order.

In further features, the method further includes, using the user device, receiving the user input communicated via infrared (IR) signals by a remote control device.

In further features, the user device is a set top box.

In further features, the user device is a mobile device.

In further features, the user device includes the display.

In further features, the method further includes, using the user device, initializing the order to a predetermined order.

In further features, the predetermined order includes the channels in order of increasing channel number.

In further features, the method further includes, while displaying the EPG, using the user device, further displaying video communicated via one of the channels on a portion of the display.

In a feature, a user device for displaying video content on a display is disclosed. A channel order mapping is stored in memory and includes a list of channels that can be displayed on the display and an order that the channels are to be displayed in an electronic program guide (EPG) on the display. A display control module, in response to a first user input to display the EPG, displays on the display the EPG. This EPG includes: the channels in the order indicated in the channel order mapping; and information regarding content scheduled to be broadcast on the channels, respectively. An order updating module, in response to user input to change the order, changes the order stored the channel order mapping according to changes commanded by a user of the user device. In response to a second user input to display the EPG received after the updating, the display control module displays on the display the EPG including: the channels in the updated order indicated in the channel order mapping after the updating; and information regarding content scheduled to be broadcast on the channels, respectively.

In further features, the order updating module moves a selected channel up in the order stored in the channel order mapping in response to a command from the user to move the selected channel up in the order.

In further features, the order updating module moves a selected channel up and down in the order stored in the channel order mapping in response to commands from the user to move the selected channel up and down, respectively, in the order.

In further features, an infrared (IR) communication interface receives the user input communicated via IR signals by a remote control device.

In further features, the user device is a set top box.

In further features, the user device is a mobile device.

In further features, the user device includes the display.

In further features, the order is initially set to a predetermined order.

In further features, the predetermined order includes the channels in order of increasing channel number.

In further features, while displaying the EPG, the display control module further displays video communicated via one of the channels on a portion of the display.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 7A-7B are example illustrations of channel order mappings.

DETAILED DESCRIPTION

Figure 1:
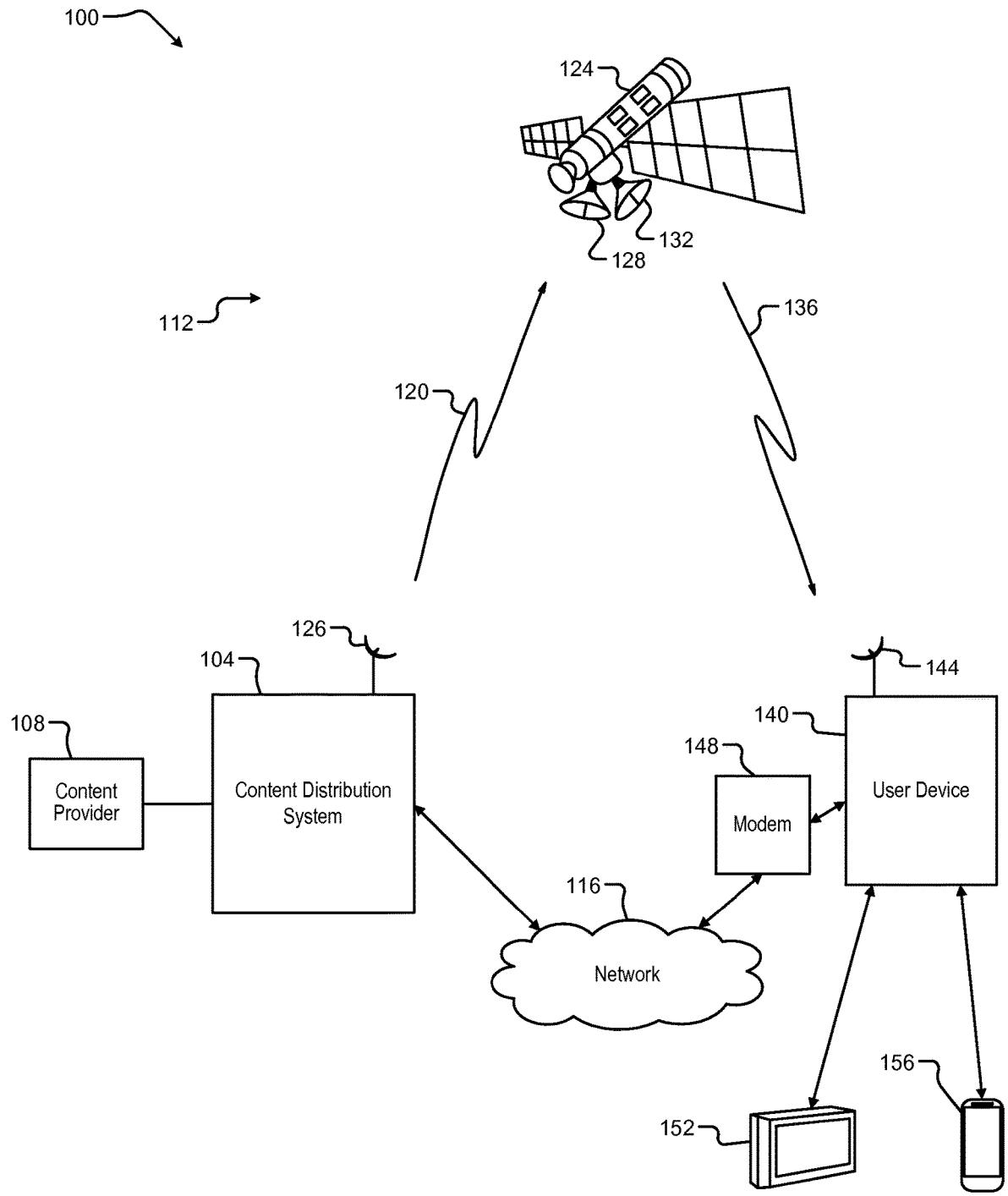
FIG. 1 is a high level functional block diagram of an example satellite distribution system.

The following description is merely exemplary in nature and is not intended to limit the present disclosure, application, or uses. For purposes of clarity, the same reference numbers will be used in the drawings to identify similar elements. It should be understood that steps within a method may be executed in different order without altering the principles of the present disclosure.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc. However, it will be readily apparent to persons of ordinary skill in the art that these terms are substantially equivalent in reference to the example systems and/or methods disclosed herein.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a functional block diagram of an example satellite distribution system 100 is illustrated. A content distribution system 104 receives content from a plurality of content providers, such as content provider 108. The content distribution system 104 communicates content and other data to users via one or more communication networks, such as a content delivery system 112 and/or a network 116, such as an Internet Protocol (IP) network.

While the content delivery system 112 is shown and will be described as being a satellite content delivery system, the content delivery system 112 may be another suitable type of content delivery system, such as, but not limited to, a wired content delivery system, a wireless content delivery system, a cable content delivery system, and/or a high frequency content delivery system.

Carrying through with the satellite content delivery system example, the content distribution system 104 generates uplink signals 120 and communicates the uplink signals 120 to one or more satellites, such as satellite 124. The content distribution system 104 communicates the uplink signals 120 to the satellite(s) via an antenna 126.

The satellite 124 includes a receiving antenna 128 and a transmitting antenna 132. The satellite 124 receives the uplink signals 120 via the receiving antenna 128. The satellite 124 generates downlink signals 136 based on the uplink signals 120 and transmits the downlink signals 136 to a plurality of user devices, such as user device 140. For example, the satellite 124 may transmit the downlink signals 136 over a geographical area for reception by user devices located within that geographical area. The satellite 124 transmits the downlink signals 136 via the transmitting antenna 132.

The user device 140 may include, for example, a set-top box, a digital video recorder (DVR), a network gateway, a combination set-top box/DVR/network gateway, or another suitable type of user device. The user device 140 may be used in a fixed setting, such as in a building. Additionally or alternatively, the user device 140 may be used in a mobile setting, such as in a vehicle (e.g., plane, train, boat, automobile, etc.).

The user device 140 receives the downlink signals 136 via an antenna 144. The antenna 144 may be fixed in a single direction (e.g., when used in a fixed setting) or may be a tracking antenna in various implementations (e.g., when used in a mobile setting). One or more cables for communicating audio/visual (A/V) signals may be connected between the antenna 144 and the user device 140.

The user device 140 may also receive A/V data via the network 116, such as from the content distribution system 104 and/or one or more other data sources that can be accessed via the network 116. The user device 140 may communicate via the network 116 via one or more networking devices, such as a modem 148, a router, and/or a telephone (not shown). The user device 140 may also receive A/V signals via one or more radio frequency (RF) antennas (not shown).

The user device 140 generates A/V signals based on received signals and transmits A/V signals to one or more output devices, such as a display 152. In various implementations, the user device 140 may be implemented within a display. The user device 140 may store A/V data in a computer-readable medium (e.g., within the user device 140), for example, for transmission at a later time as commanded by a user.

The user device 140 may also wirelessly communicate with one or more mobile devices, such as mobile device 156. Examples of mobile devices include, but are not limited to, personal media devices, cellular phones, tablet computers, personal computers, and other types of electronic devices. For example, the user device 140 may communicate wirelessly using an IEEE 802.11 wireless communication standard, a Bluetooth communication standard, a Zigbee communication standard, and/or one or more other suitable wireless communication standards. The mobile devices 156 may additionally or alternatively receive A/V data via the network 116 (without prior transmission through the user device 140).

Figure 2:
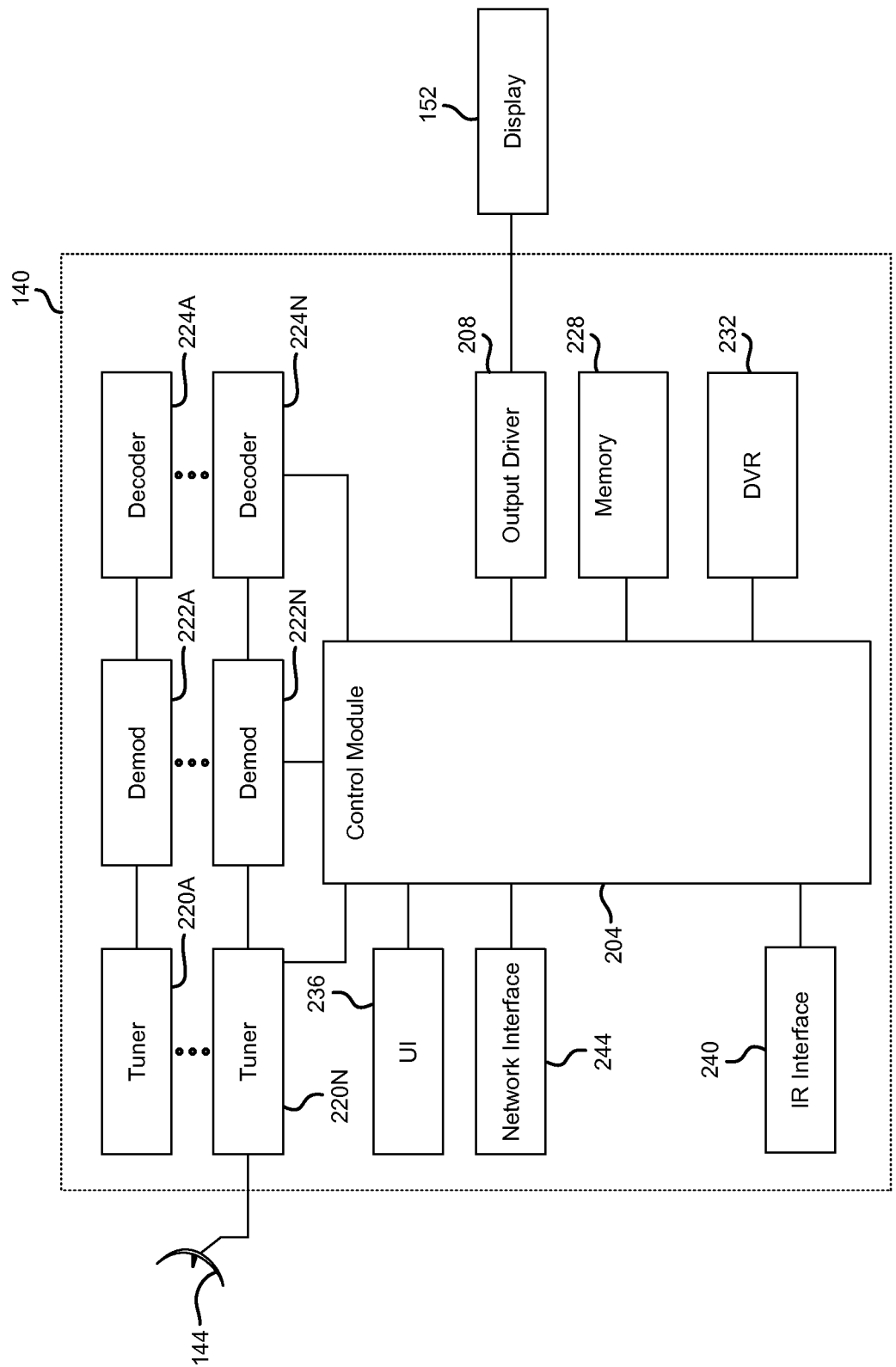
FIG. 2 is a functional block diagram of an example user device.

Referring now to FIG. 2, a functional block diagram of an example implementation of the user device 140 is presented. Although, a particular configuration of the user device 140 is shown and will be discussed, it is merely representative of various electronic devices with an internal control module used as a content receiving device.

The antenna 144 may be one of a number of different types of antennas that may include one or more low noise blocks associated therewith. The antenna 144 may be a single antenna used for satellite television reception. Of course, multiple antennas for different orbital slots may be used. In a cable system no antenna may be used. Rather, a connector to a cable may be used. The user device 140, as described above, is coupled to a display, such as the display 152. The display may be implemented within other types of devices. A control module 204 controls an output driver 208 to control what is displayed on the display 152.

The control module 204 coordinates and controls various functions of the user device 140. These functions may include, for example, tuning performed by one or more tuners 220A-220N ("tuners 220"), demodulation performed by one or more demodulator 222A-222N ("demodulators 222"), decoding performed by one or more decoders 224A-224N ("decoders 224"), buffering, and/or one or more other functions.

The tuners 220 receive content transmitted on multiple different channels. The tuners 220 tune to individual channels based on signals from the control module 204 and output signals corresponding to the tuned channel. The control module 204 controls the tuners 220 based on user input. The demodulators 222 demodulate the outputs of the tuners 220. The decoders 224 decode signals output by the demodulators 222. By providing a number of tuners, demodulators, and decoders, a multiple different TV content streams may be used by the user device 140. For example, live viewing and recording may be performed simultaneously. Additionally or alternatively, multiple different TV content streams may be displayed in different portions of the display.

The control module 204 is in communication with memory 228. The memory 228 is illustrated as a single component. However, the memory 228 may include a one or more different types of memory including a hard drive, a flash drive, and/or one or more other types and/or storage devices.

The memory 228 may include storage for various operational data collected during operation of the user device 140. For example, scheduled recording data corresponding to scheduled recording events may be stored. Conflict data and conflict resolution data may also be stored. The memory 228 may store various types of data including set top box playlist data that has the playlist for content saved within the memory 228. Another type of data stored in the memory 228 is favorite settings for the user device 140. Another type of data in the memory 228 may include user profile data, channels subscription data, blocked channels, rating limits set for the user device 140, current set top box language, prioritizer data, TV resolution data, to do list data, time zone data, time of day daylight savings, status data, aspect ratio data, viewing hours data, quick tune list, a zip code, and/or other data.

The user device 140 may include a digital video recorder 232. The digital video recorder 232 may, based on user requests to store TV content, store that TV content in the memory 228.

The user device 140 may also include a user interface 236. The user interface 236 may include various types of user interfaces such as a keyboard, push buttons, a touch screen, a voice activated interface or the like. A user may interact with the user interface 236, for example, to change channels, power ON and OFF, adjust audio volume, change the display appearance, and/or other functions.

The user device 140 also includes an infrared (IR) interface 240 for communicating with a remote control device. The control module 204, for example, changes channels, adjusts audio volume, displays an EPG, and performs other functions based on commands received from that device. While the example of an IR interface and a remote control device are provided, another suitable type of wireless communication interface and/or another suitable type of wireless device may be used. The user device 140 may also include a network interface 244 may be included within the user device to communicate via the network 116.

Electronic Program Guide (EPG) data is also stored in the memory 228. The memory 228 may store program guide data that is received from the head-end. The EPG data may include content scheduled to be broadcast on each channel at present and during a predetermined period (e.g., two weeks) into the future. The program guide data may be communicated to the user device 140 in various ways, such as through the satellite 124 of FIG. 1.

The EPG data includes a channel order mapping (table) that correlates channel number to an order in which the channels are to be displayed in the EPG. By default, this mapping may be set such that the channels are displayed in the EPG with the lowest numbered channel appearing first (i.e., at the top) in the EPG, a highest numbered channel appearing at last (i.e., at the bottom) in the EPG, and channels between the lowest and highest numbers displayed in the EPG in increasing order from the top toward the bottom. An example of the channel order mapping in its default state is provided in FIG. 7A.

When a user requests that the EPG be displayed (e.g., via the remote control), the control module 204 generates the EPG on the display 152 and lists the channels in the EPG in the order specified in the channel order mapping starting at the top of the EPG. According to the present disclosure, a user can adjust the order in which channels are displayed in the EPG. For example, a user may move a channel that the user frequently views such that the channel is displayed closer to or at the top of the EPG than it would by default. An example updated EPG is provided in FIG. 7B.

Figure 3:
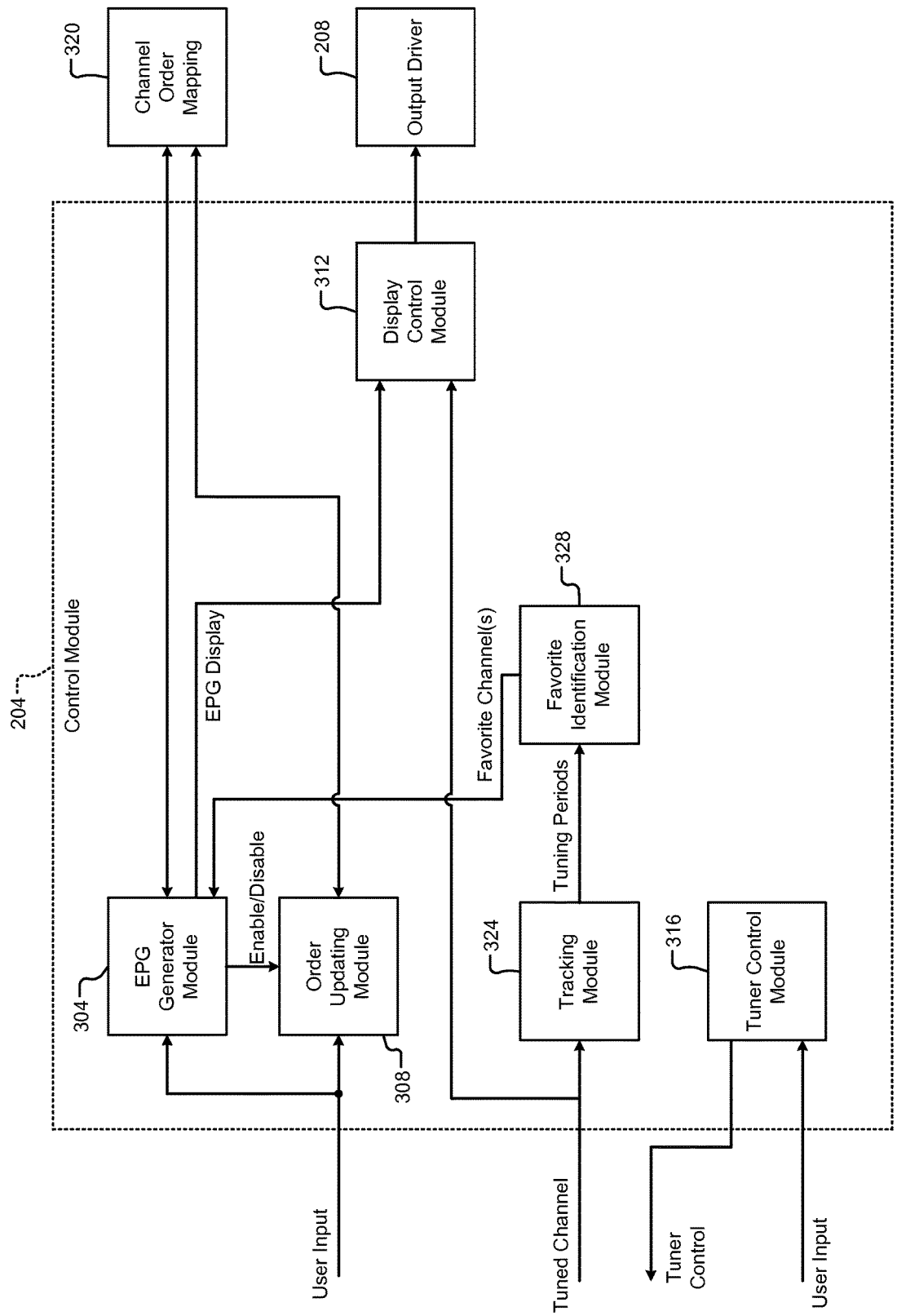
FIG. 3 is a functional block diagram of an example portion of a control module of the user device.

FIG. 3 is a functional block diagram of an example portion of the control module 204. The control module 204 includes an EPG generator module 304, an order updating module 308, a display control module 312, and a tuner control module 316. An example channel order mapping 320 is also illustrated in FIG. 3 and may be stored in the memory 228. In various implementations, one channel order mapping may be stored for each different user profile within the user device 140. Multiple users may use different user profiles (and the associated channel order mappings), for example, by inputting a username and password or another suitable form of user authentication. Which channel order mapping is used may therefore be selected according to the user profile being used.

The tuner control module 316 controls the tuners 220 based on user input. For example, the tuner control module 316 controls one of the tuners 220 to tune to a channel selected by a user for display on the display 152. The display control module 312 controls the output driver 208 to display video on the tuned channel on the display 152. While not shown, the control module 204 also controls audio output on the tuned channel via speakers. The tuner control module 316 may also control one of the tuners to tune to a channel so audio and video on that channel can be recorded and later displayed on the display 152.

When the user inputs a command to display the EPG, the display control module 312 displays the EPG on the display 152. The EPG generator module 304 communicates how to display the EPG to the display control module 312. While displaying the EPG, the display control module 312 may also display the tuned channel within a portion of the display 152 not occupied by the EPG.

Figure 4:
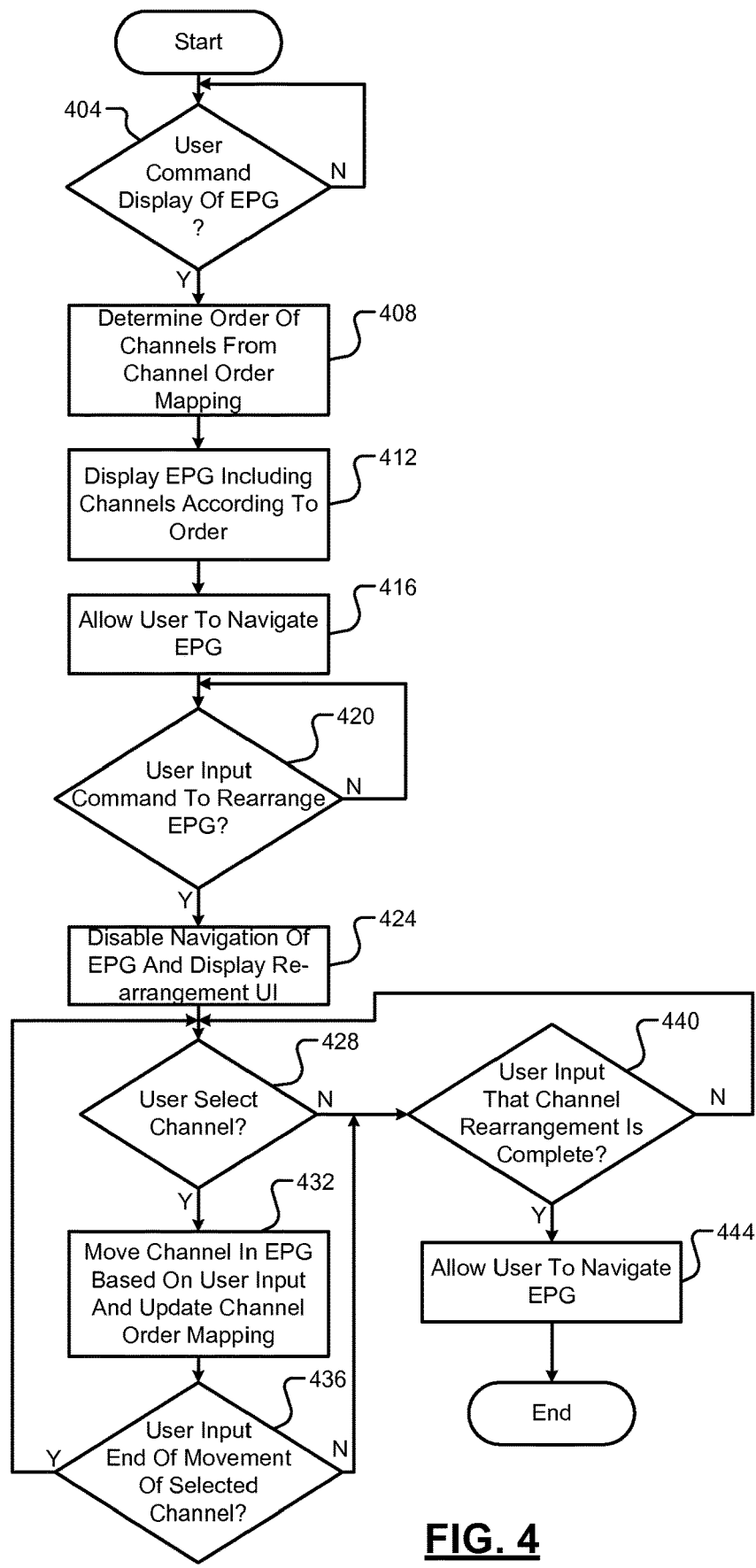
FIG. 4 is a flowchart depicting an example method of re-arranging an order that channels are listed in an electronic program guide based on user input.

FIG. 4 is a flowchart depicting an example method of updating the order that channels are displayed in the EPG based on user input. Referring now to FIGS. 3 and 4, control may begin with 404 where the EPG generator module 304 determines whether the user has input a command to display the EPG. If 404 is true, control continues with 408. If 404 is false, control may remain at 404. The user may input a command to display the EPG, for example, by actuating an EPG button of the remote control or the user interface 236.

At 408, the EPG generator module 304 determines the order that the channels are to be displayed in the EPG from the channel order mapping 320. The EPG generator module 304 prompts the display control module 312 to display the EPG including listing the channels (beginning at the top of the EPG) in the order specified in the channel order mapping 320. As discussed above, the channel order mapping 320 may be set by default to list the channels in increasing order starting with a lowest numbered channel listed first. As discussed below, however, the user may change the order of the channels and, therefore, rearrange the channels in the EPG.

At 412, the display control module 312 displays the EPG on the display 152 as indicated by the EPG generator module 304. The display control module 312 may also display the channel currently tuned by the user on a portion of the display 152 not occupied by the EPG. Along with each channel, the display control module 312 displays the content scheduled to be broadcast on those channels and indicates when that content is scheduled to be broadcast.

The display control module 312 allows the user to navigate the EPG as normal at 416. Navigation of the EPG may include, for example, scrolling through the channels and/or the content scheduled to be broadcast. For navigation, the display control module 312 highlights one item (e.g., channel or content) in the EPG at a time, such as by encircling the item. The display control module 312 may also display information describing the highlighted item. The user can change which item is highlighted, for example, using directional buttons of the remote control device and/or using the user interface 236. Using the EPG, the user can command tuning to a channel by selecting that channel or selecting an item to be broadcast on that channel.

At 420, while displaying the EPG, the EPG generator module 304 determines whether the user has input a command to re-arrange the order of the channels in the EPG. The user may input a command to re-arrange the order of the channels in the EPG, for example, by depressing a re-arrangement button on the remote control device or by depressing a predetermined combination or sequence of one or more buttons on the remote control device. If 420 is true, the EPG generator module 304 enables the order updating module 308, and control continues with 424. If 420 is false, control may remain at 420 and the user may continue navigation of the EPG.

At 424, the display control module 312 disables the ability of the user to navigate the EPG and displays an EPG re-arrangement mode user interface on the display 152. The EPG re-arrangement mode user interface may include a list of the channels. A subset of the total number of channels may be listed at any given time for clarity of the displayed list. The subset of channels that are listed may be changed, for example, by scrolling down or past a last channel listed. Initially, the channels may be listed in the order specified in the channel order mapping 320. The user can change the order that the channels are displayed in the EPG, however, via the EPG re-arrangement mode user interface.

While the EPG re-arrangement mode user interface is displayed, the display control module 312 highlights one channel in the list, such as by encircling that channel. The user can change which item is highlighted, for example, using directional buttons of the remote control device and/or using the user interface 236.

At 428, the order updating module 308 determines whether the user has selected one of the channels for re-ordering. The user may select a channel for re-ordering, for example, by pressing an enter button on the remote control device while that channel is highlighted. If 428 is true, control continues with 432. If 428 is false, control may transfer to 440, which is discussed further below. Selection of a channel by the user allows the user to move that channel up or down in the list. The movement will be reflected in the channel order mapping 320 to change the order that the channels will be listed in the EPG.

At 432, the display control module 312 indicates that the selected channel can then be moved up or down in the list on the display 152 and moves the selected channel up or down in the list displayed as commanded by the user. The display control module 312 may indicate that a selected channel can be moved up or down in the list, for example, by highlighting the selected channel in another manner.

The user can move a selected channel up in the list, for example, by using an up directional button of the remote control device and/or using the user interface 236. When moving a selected channel up in response to a user command, the display control module 312 also moves the channel that was previously immediately above the selected channel in the list down in the list. The user can change move a selected channel down in the list, for example, by using a down directional button of the remote control device and/or using the user interface 236. When moving a selected channel down in response to a user command, the display control module 312 also moves the channel that was previously immediately below the selected channel in the list up in the list.

The order updating module 308 updates the channel order mapping 320 at 432 according to the order that the channels are listed in the EPG re-arrangement mode user interface. As such, the channel order mapping 320 is updated to reflect the movement of selected channels made by the user.

At 436, the order updating module 308 determines whether the user has input a command indicative of the end of movement of the selected channel. If 436 is true, control returns to 428 so the user can select and move one or more other channels within the list. If 436 is false, control may transfer to 440. For example, the user may input a command indicative of the end of movement of a selected channel by again pressing the enter button on the remote control device.

The order updating module 308 may determine whether the user has input a command indicative of an end of the re-arrangement of the order of the channels in the EPG at 440. If 440 is true, control may continue with 444. If 440 is false, control may return to 428. The user may input a command to end the re-arrangement, for example, by depressing a return button on the remote control device. The display control module 312 may then return to displaying the EPG, with the channels listed in the updated order reflected in the updated channel order mapping 320, and allow the user to navigate the EPG.

The user inputting a command to exit the EPG (e.g., via depressing an exit button of the remote control device) may also indicate an end of the movement of the selected channel and an end of the re-arrangement. The display control module 312 may in response remove the EPG re-arrangement mode user interface from the display 152. In this case, the display control module 312 may also remove the EPG from the display 152 and display the tuned channel on the display 152.

Referring back to FIG. 3, the control module 204 may also include a tracking module 324 and a favorite identification module 328. The tracking module 324 continuously monitors the channel that is tuned to. When a channel is tuned, such that the content communicated via that channel is or could be displayed on the display 152, the tracking module 324 increments a tuning period associated with that channel. One tuning period is kept for each channel. The tuning periods correspond to the periods that the user has spent during a last predetermined period (e.g., two weeks, one month, etc.) with the user device 140 tuned to display the channels, respectively.

The favorite identification module 328 determines whether the channels are favorite channels of the user based on comparisons of the tuning periods of the channels, respectively, with a predetermined period. The favorite identification module 328 determines and indicates that a channel is a favorite channel of the user when the tuning period of that channel is greater than the predetermined period (e.g., 8 hours during the last 2 weeks). Favorite channels may be determined and stored for each user profile.

The favorite identification module 328 indicates the favorite channels of the user to the EPG generator module 304. When the user commands the EPG be displayed, the EPG generator module 304 inserts the indicated favorite channels of the user at the top of the EPG. The EPG generator module 304 may list the user's favorite channels at the top of the EPG, for example, in decreasing order of the favorite channels' tuning periods, respectively. More specifically, the one of the user's favorite channels having the largest tuning period may be first (i.e., at the top) of the EPG, the one of the user's favorite channels having a second largest tuning period may be displayed second (from the top) in the EPG, the one of the user's favorite channels having a third largest tuning period may be displayed third (from the top) in the EPG, and so on. After the favorite channels are listed, the EPG generator module 304 displays the channels in the order specified in the channel order mapping 320. Thus, the information for the favorite channels may be provided twice in the EPG: once at the top; and once in the place specified in the channel order mapping 320. In various implementations, favorite channels listed at the top of the EPG may not be duplicated in the place specified in the channel order mapping 320.

Figure 5:
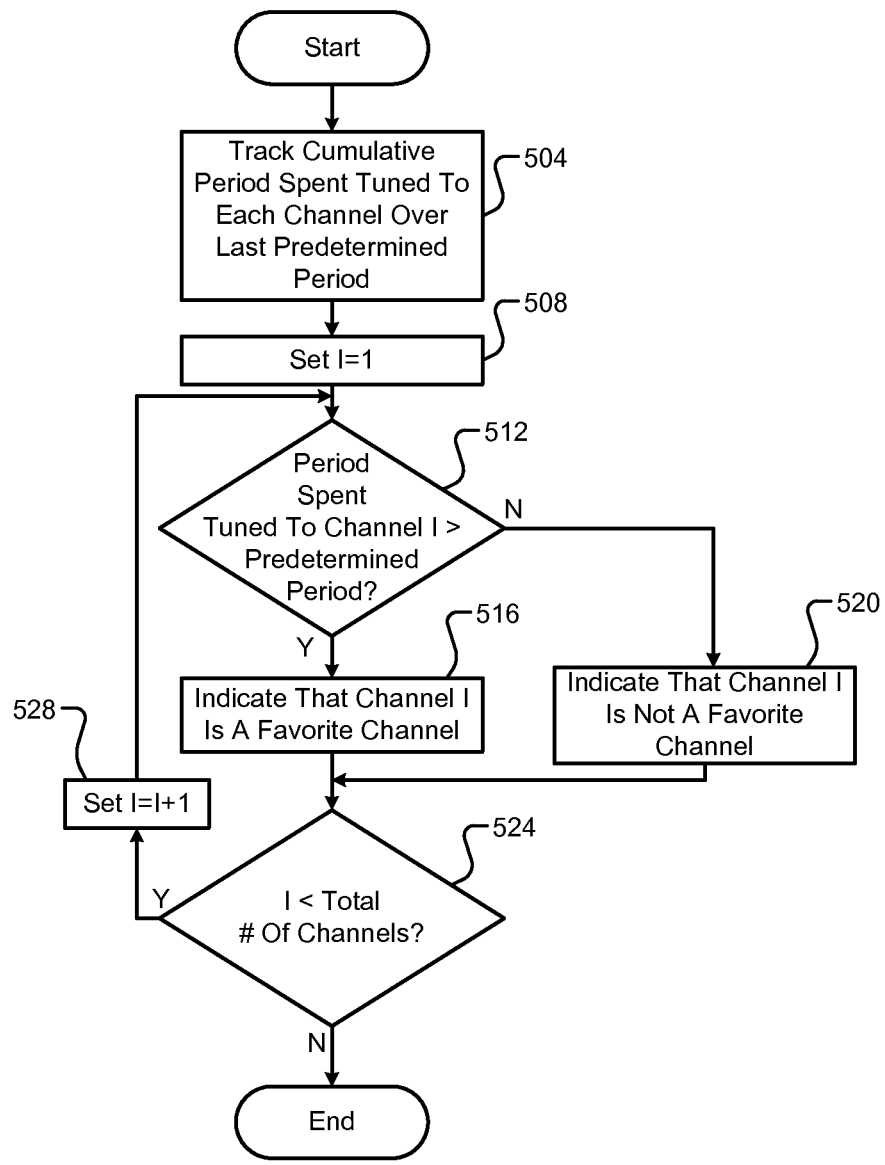
FIG. 5 is a flowchart depicting an example method of identifying favorite channels of a user.

FIG. 5 is a flowchart depicting an example method of identifying a user's favorite channels. Referring now to FIGS. 3 and 5, 504 indicates that the tracking module 324 tracks the total amount of time spent tuned to each channel during the last predetermined period (e.g., 2 weeks). In other words, at 504, the tracking module 504 tracks the tuning periods of the channels, respectively. While 504 is only shown once, the tracking module 324 continuously tracks which channel the user device 140 is tuned to and increments that channel's respective tuning period.

At 508, the favorite identification module 328 may set a counter value (I) equal to 1. At 512, the favorite identification module 328 determines whether the tuning period of channel I (e.g., channel 1 in a first instance of 512) is greater than the predetermined period (e.g., 8 hours over the last 2 weeks). If 512 true, the favorite identification module 328 indicates that channel I is one of the user's favorite channels at 516, and control continues with 524. If 512 is false, the favorite identification module 328 indicates that channel I is not one of the user's favorite channels at 520, and control continues with 524.

At 524, the favorite identification module 328 determines whether the counter value I is less than a total number (N) of channels that the user can tune the user device 140 to. If 524 is true, the favorite identification module 328 increments the counter value I at 528, and control returns to 512 to determine whether that channel is one of the user's favorite channels. If 524 is false, control may end. While control is shown as ending after 524, the example of FIG. 5 may be executed every predetermined period or control may start over.

Figure 6:
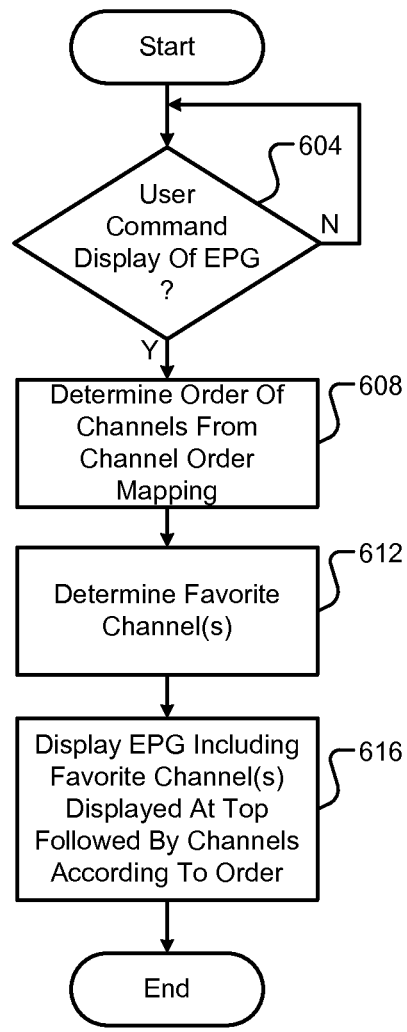
FIG. 6 is a flowchart depicting an example method of inserting identified favorite channels of a user into an EPG.

FIG. 6 is a flowchart depicting an example method of displaying channels in the EPG. Control begins with 604 where the EPG generator module 304 determines whether the user has input a command to display the EPG. If 604 is true, control continues with 608. If 604 is false, control may remain at 604. The user may input a command to display the EPG, for example, by actuating an EPG button of the remote control or the user interface 236.

At 608, the EPG generator module 304 determines the order that the channels are to be displayed in the EPG from the channel order mapping 320. At 612, the EPG generator module 304 determines which channels the favorite identification module 328 has identified as being the user's favorite channels, if any. At 616, the EPG generator module 304 prompts the display control module 312 to display the EPG including listing the favorite channels at the top of the EPG followed by the channels listed in the order specified in the channel order mapping 320. The EPG generator module 304 may prompt the display control module 312 to display the favorite channels in the order of decreasing tuning period such that the favorite channel having the largest tuning period is listed first (at the top) and the favorite channel having smallest tuning period is listed last (before the listing according to the channel order mapping 320 begins).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A user device for displaying video content on a display, the user device comprising:
   a channel order mapping that is stored in memory and that includes a list of channels, each of the channels having an associated channel number that can be displayed on the display, said channel order mapping comprising an order that the channels are to be displayed in an electronic program guide (EPG) on the display;
   a favorite channel identification module that indicates a plurality of favorite channels, a tracking module identifying a channel is one of the plurality of favorite channels when a tuning period for the channel is greater than a predetermined period;
   a display control module that, in response to a first user input to display the EPG, displays on the display the EPG including:
      the plurality of favorites channels in a first order followed by the channels in the order indicated in the channel order mapping and the associated channel number so that the plurality of favorites channels are not duplicated in the channel order mapping; and
      information regarding content scheduled to be broadcast on the channels, respectively;
   an order updating module that, in response to a second user input to change the order, changes the order of the plurality of favorites channels to form reordered favorites channels according to changes commanded by a user of the user device while maintaining an association of the channel number with the channel, by moving a selected channel up and down in the plurality of favorites channels in response to commands from the user to move the selected channel up and down, respectively, in the order;

wherein, in response to a third user input to display the EPG received after the updating, the display control module displays on the display, the EPG including:
the reordered favorites channels followed by the channels in the order indicated in the channel order mapping after the updating and the associated channel number whereby the channel numbers are not displayed in numerical order; and
information regarding content scheduled to be broadcast on the channels, respectively.

2. The user device of claim 1 further comprising an infrared (IR) communication interface that receives the user input communicated via IR signals by a remote control device.

3. The user device of claim 1 wherein the user device is a set top box.

4. The user device of claim 1 wherein the user device is a mobile device.

5. The user device of claim 1 wherein the user device includes the display.

6. The user device of claim 1 wherein the order is initially set to a predetermined order.

7. The user device of claim 6 wherein the predetermined order includes the channels in order of increasing channel number.

8. The user device of claim 1 wherein, while displaying the EPG, the display control module further displays video communicated via one of the channels on a portion of the display.

9. A method for displaying video content on a display, the method comprising:
storing, using a user device, a channel order mapping in memory of the user device, the channel order mapping including a list of channels each having an associated channel number that can be displayed on the display and an order that the channels are to be displayed in an electronic program guide (EPG) on the display;
identifying a plurality of favorites channels, said plurality of favorite channels determined by identifying a channel is one of the plurality of favorite channels when a tuning period for the channel is greater than a predetermined period;
in response to a first user input to display the EPG, using the user device, displaying on the display the EPG including:
the plurality of favorites channels in a first order followed by the channels in the order indicated in the channel order mapping and the associated channel number so that the plurality of favorites channels are not duplicated in the channel order mapping; and
information regarding content scheduled to be broadcast on the channels, respectively;
in response to a second user input to change the order, using the user device, changing the order of the plurality of favorites channels to form recorded favorites channels according to changes commanded by a user of the user device while maintaining an association of the channel number with the channel by moving a selected channel up and down in the order stored in the channel order mapping in response to commands from the user to move the selected channel up and down, respectively, in the order; and
in response to a third user input to display the EPG received after updating, using the user device, displaying on the display the EPG including:
the reordered favorites channels followed by the channels in the updated order indicated in the channel order mapping after updating; and
information regarding content scheduled to be broadcast on the channels, respectively.

10. The method of claim 9 further comprising, using the user device, receiving the user input communicated via infrared (IR) signals by a remote control device.

11. The method of claim 9 wherein the user device is a set top box.

12. The method of claim 9 wherein the user device is a mobile device.

13. The method of claim 9 wherein the user device includes the display.

14. The method of claim 9 further comprising, using the user device, initializing the order to a predetermined order.

15. The method of claim 14 wherein the predetermined order includes the channels in order of increasing channel number.

16. The method of claim 9 further comprising, while displaying the EPG, using the user device, further displaying video communicated via one of the channels on a portion of the display.

* * * * *